United States Patent [19]
Remmers et al.

[11] Patent Number: 5,345,910
[45] Date of Patent: Sep. 13, 1994

[54] ENGINE IGNITION SYSTEM HAVING IMPROVED WARMUP ADVANCED TIMING CONTROL

[75] Inventors: Gregry M. Remmers, Ingleside, Ill.; Mark J. Skrzypchak, Kenosha, Wis.; David L. Enlow, Wadsworth, Ill.

[73] Assignee: Outboard Marine Corporation, Waukegan, Ill.

[21] Appl. No.: 49,155

[22] Filed: Apr. 19, 1993

[51] Int. Cl.⁵ ............................... F02P 5/14
[52] U.S. Cl. ............................... 123/424
[58] Field of Search ............ 123/424, 418, 416; 364/431.03

[56] References Cited

U.S. PATENT DOCUMENTS

| | | | |
|---|---|---|---|
| 3,464,397 | 9/1969 | Burson | 123/424 |
| 3,573,545 | 4/1971 | Warner | 315/209 CD |
| 3,738,339 | 6/1973 | Huntzinger et al. | 123/424 |
| 3,741,185 | 6/1973 | Swift et al. | 123/424 |
| 3,768,451 | 10/1973 | Okamoto | 123/424 |
| 3,779,218 | 12/1973 | Nambu | 123/179.5 |
| 3,793,833 | 2/1974 | van Basshuysen | 60/284 |
| 3,805,759 | 4/1974 | Fitzner | 123/424 |
| 3,813,877 | 6/1974 | Hunt | 60/424 |
| 3,923,023 | 12/1975 | Ito et al. | 123/424 |
| 3,943,896 | 3/1976 | Green et al. | 123/424 |
| 3,952,715 | 4/1976 | Van Siclen, Jr. | 315/209 CD |
| 4,015,564 | 4/1977 | Fitzner | 123/124 |
| 4,096,843 | 6/1978 | Marsee | 123/424 |
| 4,104,998 | 8/1978 | Fenn | 123/424 |
| 4,108,131 | 8/1978 | Shibukawa | 123/424 |
| 4,133,325 | 1/1979 | West | 123/424 |
| 4,170,207 | 10/1979 | Boyama | 123/424 |
| 4,244,336 | 1/1981 | Fitzner | 123/418 |
| 4,285,315 | 8/1981 | Douaud et al. | 123/425 |
| 4,306,535 | 12/1981 | Fitzner | 123/602 |
| 4,306,536 | 12/1981 | Fitzner | 123/602 |
| 4,309,759 | 1/1982 | Tokuda et al. | 123/424 |
| 4,318,387 | 3/1982 | Fitzner | 123/602 |
| 4,334,509 | 6/1982 | Nash | 123/414 |
| 4,363,304 | 12/1982 | Fritz et al. | 123/418 |
| 4,404,952 | 9/1983 | Fujimoto et al. | 123/602 |
| 4,436,076 | 3/1984 | Piteo | 123/602 |
| 4,446,841 | 5/1984 | Van Siclen, Jr. | 123/602 |
| 4,459,951 | 7/1984 | Tobinaga et al. | 123/198 DC |
| 4,485,784 | 12/1984 | Fujii et al. | 123/416 |
| 4,492,197 | 1/1985 | Yamamoto et al. | 123/630 |
| 4,498,438 | 2/1985 | Sato | 123/418 |
| 4,499,875 | 2/1985 | Katayama et al. | 123/416 |
| 4,502,441 | 3/1985 | Katayama et al. | 123/416 |
| 4,502,442 | 3/1985 | Takakuwa et al. | 123/417 |
| 4,503,822 | 3/1985 | Kobayashi et al. | 123/416 |
| 4,519,038 | 5/1985 | Matsui et al. | 364/431.03 |
| 4,520,781 | 6/1985 | Nishida | 123/414 |
| 4,527,522 | 7/1985 | Cerny | 123/416 |
| 4,562,801 | 1/1986 | Koike | 123/196 |
| 4,633,834 | 1/1987 | Takeuchi et al. | 123/424 |
| 4,940,032 | 7/1990 | Fujimoto | 123/424 |
| 4,982,712 | 1/1991 | Abe | 123/424 |
| 5,271,367 | 12/1993 | Abe | 123/418 |

Primary Examiner—Raymond A. Nelli
Attorney, Agent, or Firm—Greer, Burns & Crain, Ltd.

[57] ABSTRACT

An improved engine ignition system for a marine engine or the like, which provides reliable start-up capability. The system provides two timing characteristics for discharging a capacitive discharge ignition, one of which is advanced relative to the other. The advanced timing is invoked at startup and is switched to regular timing in response to the engine temperature reaching a predetermined temperature from a temperature switch and also as a result of a circuit having a thermistor near the engine. The thermistor circuit may operate if the temperature switch does not, due to debris or the like preventing proper operation of a thermostat.

12 Claims, 2 Drawing Sheets

ENGINE IGNITION SYSTEM HAVING IMPROVED WARMUP ADVANCED TIMING CONTROL

The present invention generally relates to an electronically assisted internal combustion engine ignition system, and more particularly to an improved system for a marine engine, such as an outboard marine engine.

An ignition system that provided improved starting and other desirable operational characteristics is the subject of U.S. Pat. No. 4,858,585, which is assigned to the same assignee as the present invention. In that patent, a system was disclosed which not only produced the improved operational characteristics that are described, but accomplished such functionality by utilizing a circuit design that comprised a relatively few number of circuit components compared to other prior ignition systems that may have had some comparable features to those disclosed in the patented system.

As is disclosed in the aforementioned patent, prior art outboard engines often utilized various means for accomplishing easier starting, including a "warm-up" lever which manually advanced the spark timing and partially opened the carburetor throttle plates to increase the running speed of the motor when it was started. As is also disclosed in the aforementioned patent, prior art engine ignition systems had utilized various means to selectively advance the ignition timing characteristic during operation, but such systems were not adapted to selectively change the timing characteristic as a function of the temperature of the engine during its warm-up phase, as well as during a predetermined time period regardless of the temperature of the engine, and as a function of the operating speed of the engine, particularly when operated at a relatively high speed.

The above mentioned patent provided an improved ignition system for an internal combustion engine, such as an outboard marine engine or the like, which provided multiple functions that improve the operation of the engine, as well as protect the engine during start-up and subsequent operation of the engine.

While the above mentioned patent describes an ignition system that provides improved operation compared to prior ignition systems, the present invention represents yet an additional improvement to the patented system, particularly with respect to the warm-up phase of operation.

Accordingly, it is an object of the present invention to provide a further improved ignition system for an internal combustion engine that provides advanced ignition timing during starting of the engine, and automatically controls the duration of the advanced ignition timing as a function of the temperature of the engine.

Another object of the present invention is to provide such an improved ignition system that provides advanced ignition timing during starting of the engine, which system maintains the advanced ignition timing for a longer variable time period if the engine is started from a cold condition, compared to the time period that is employed when the engine is started when it is warm, i.e., a hot restart condition.

Other objects and advantages will become apparent upon reading the following detailed description, while referring to the attached drawing, in which.

DETAILED DESCRIPTION OF THE INVENTION

Figure 1:
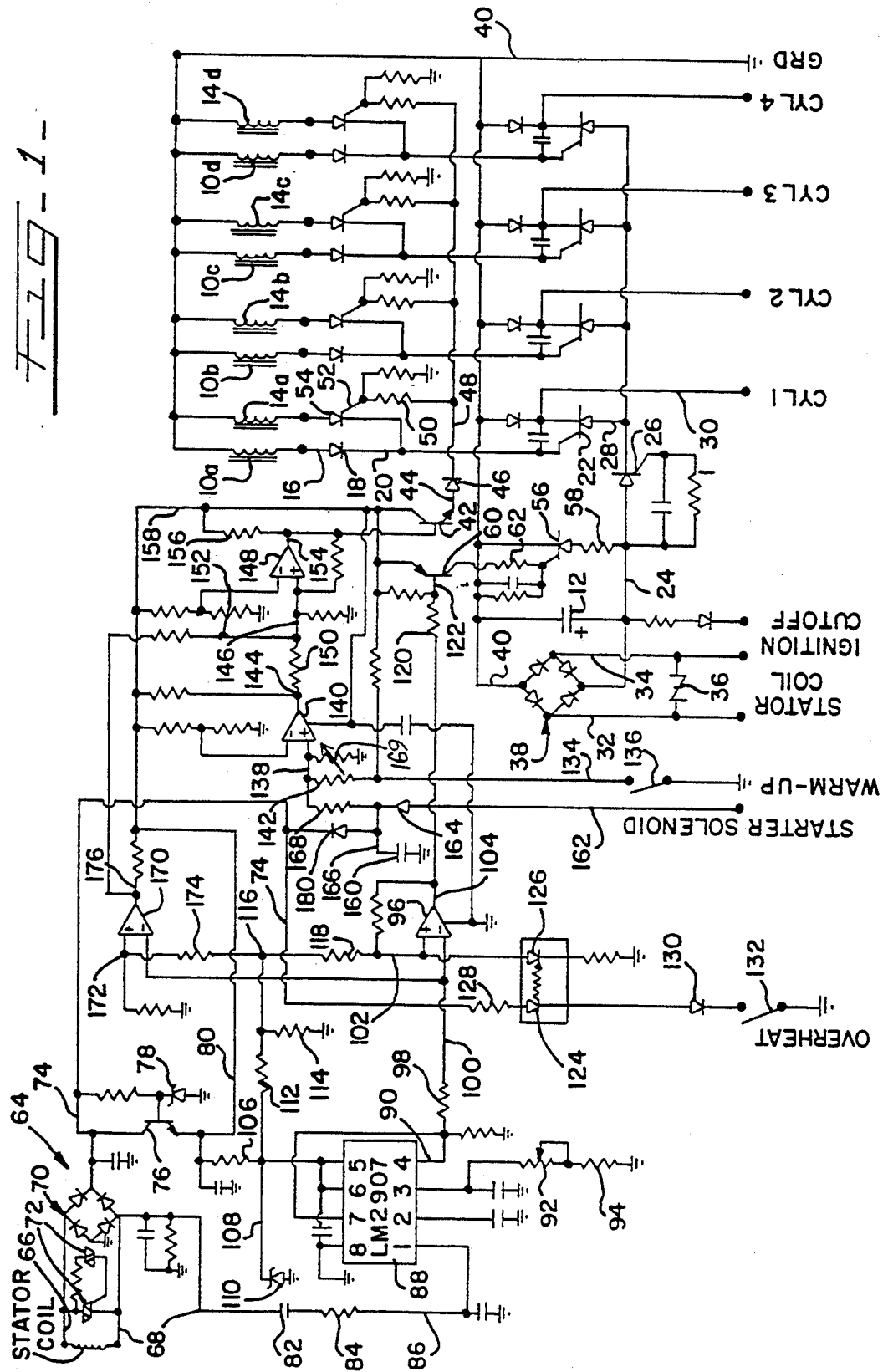
FIG. 1 is a electrical schematic diagram of the ignition system of the present invention.
Figure 2:
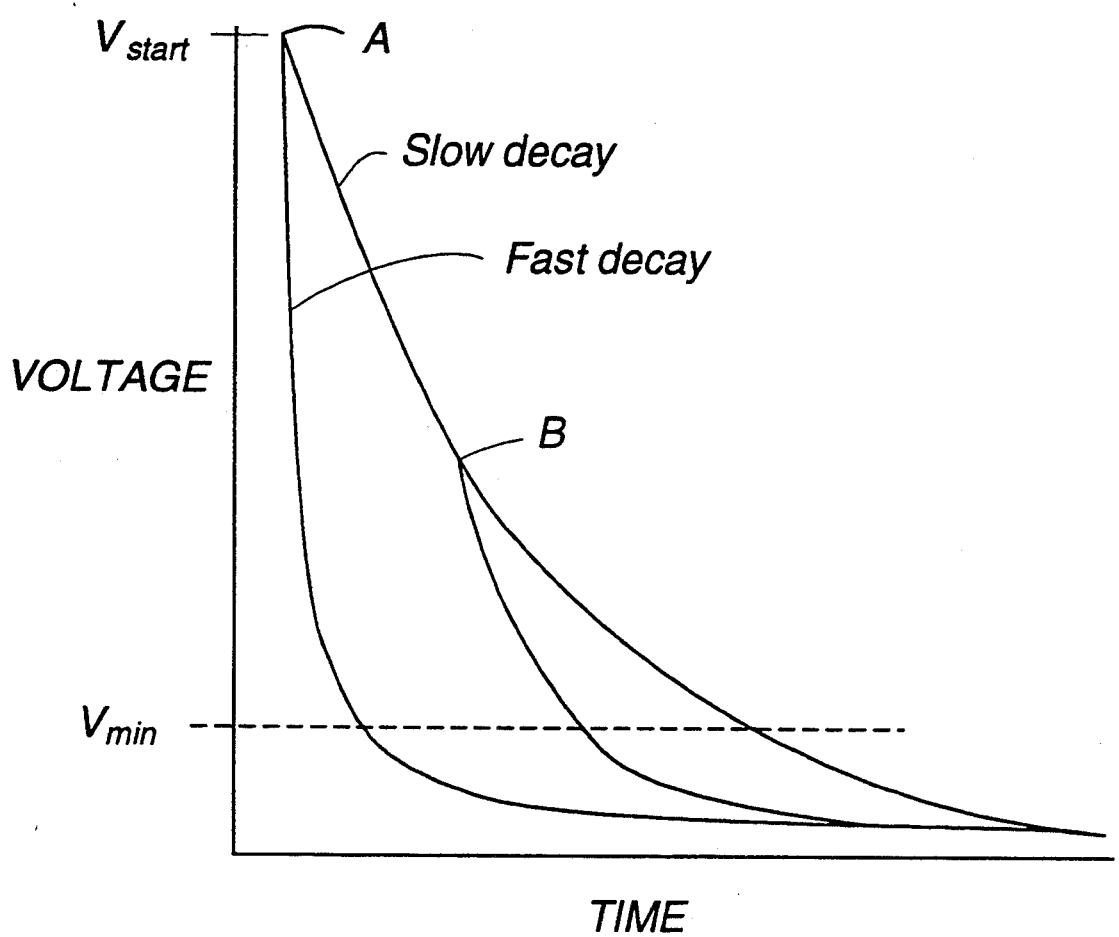
FIG. 2 is a graph illustrating a voltage versus time characteristic of the present invention.

Broadly stated, the present invention relates to an ignition system for an internal combustion engine, such as an outboard engine for marine use or the like, which has superior operational characteristics, including providing an advanced ignition timing characteristic having a time duration that varies as a function of the temperature of the engine, and whether it is being restarted after having been run.

The ignition system of the present invention is adapted to function with portions of a capacitive discharge ignition system that are well known and refined over many years and are proven to be reliable. The present invention provides for automatic advance of the timing characteristic during startup and until smooth operation is achieved, which aids in starting and in the initial operation. In this regard, the advance is automatically invoked for a short time period during initial operation regardless of the temperature of the engine, i.e., even though the engine may have been running and was warm, and also advances the ignition timing characteristic when the engine is started cold and maintains the advance in effect until the engine reaches a warmup temperature within the range of about 80° to about 90° F., or for at least a few minutes if the thermostat valve does not properly operate. However, the advance is inhibited if the operating speed reaches the predetermined speed threshold as just described.

While the present invention is particularly adapted for use with outboard marine engines, as well as other marine engines, it certainly is not limited to applications involving only marine use. Also, while the detailed description of the invention describes specific circuitry to accomplish the operation of the system, it should be understood that circuit functionality may be accomplished by using similar components that may operate using different voltage levels, or different components to provide the same function. Logic circuit elements can have a "true" output that may be a voltage high or low, for example, and the circuit could be modified to accomplish the same function.

Turning now to the drawing, a conventional timer base for triggering the discharge of the ignition capacitor is shown at the upper right of the drawing and includes a number of coils 10a, 10b, 10c and 10d (for a four cylinder engine) and cooperate with a magnet (not shown) preferably located on the flywheel for inducing a voltage in the respective coils for discharging an ignition capacitor 12 as the engine operates to produce the normal ignition timing characteristic. There are also a number of coils 14a, 14b, 14c and 14d that are provided to produce an advanced ignition timing characteristic, and this is achieved by placing the respective coils 14 ahead of the coils 12 by a predetermined angle, preferably about 10°. If the ignition system has the advance coils 14 in operation, the timing characteristic is advanced by the predetermined angle inasmuch as the coils 14 will trigger the discharge of the ignition capacitor rather than the coils 12.

The capacitive discharge ignition portion of the circuitry operates identically with respect to each of the cylinders that may be present in the engine. In the disclosed embodiment, there are four cylinders; the circuitry for only one of the cylinders will be described.

When coil 10a is passed in proximity to the magnet, a voltage is induced in coil 10a which applied to line 16, through diode 18 to line 20 and is applied to the gate of an SCR 22, triggering it into conduction and discharges the previously charged ignition capacitor through a line 24, an SCR 26, a line 28, the SCR 22, a line 30 to the ignition coil primary of cylinder no. 1. The ignition capacitor 12 is charged by a stator coil (not shown) connected through lines 32 and 34, a Sidac 36 and diode bridge 38, one side of which is connected to the capacitor 12 by a line 40, the other being connected to the capacitor by line 24.

To provide the advanced timing characteristic, the coils 14 are enabled, and by virtue of their position being angularly advanced relative to the coils 10, trigger the discharge of the ignition capacitor by approximately 10° relative to the coils 10. This is accomplished by a switching transistor 42 being switched into conduction by the control circuitry portion of the present invention. When transistor 42 is switched into conduction, current flows through a line 44, a diode 46, a line 48, a resistor 50, a line 52, which is connected to the gate of a SCR 54 and switches it on, which places coil 14a (as well as the other coils 14) into operation so that coils 14 trigger the discharge first, rather than coils 10. Thus, when transistor 42 is conducting, the coils 14, which provide the advanced timing characteristic, are placed in operation. When transistor 42 is switched off, the ignition system returns to its nonadvanced timing characteristic.

The control circuitry operates to cut out the ignition system so that damage will not be done to the engine. This is done by preventing the ignition capacitor 12 from charging. By preventing charging of the capacitor 12, the overall engine speed can be controlled. In the preferred embodiment disclosed, this is accomplished by a SCR 56 and a resistor 58 connected in series across the capacitor 12 by lines 24 and 40. When SCR 56 is switched into conduction, the ignition capacitor is shunted to ground, and is therefore prevented from charging and cannot provide energy to the spark plug when triggered by the coils 10 or 14.

The SCR 56 operation is controlled by a switching transistor 60 having its collector connected to the gate of SCR 56 through a resistor 62. When the transistor 60 is switched into conduction, the SCR 56 is switched into conduction, which shunts the capacitor 12 and prevents it from charging.

A power supply, indicated generally at 64, includes lines 66 and 68, which are connected to a diode bridge 70, with two Zener diodes 72 connected between lines 66 and 68, and provides a 12 volt output on line 74, which is regulated by transistor 76 and zener diode 78 as shown, to provide a regulated 12 volt supply on line 80. The stator coil produces a pulse on line 68 for each magnetic reversal of the flywheel magnets and thereby provides a tachometer pulse on line 68 which is applied through a capacitor 82, a resistor 84 and a line 86 to pin 1 of a frequency-to-voltage convertor 88. The convertor 88 has an output line 90 that has a voltage level that is directly proportional to the frequency of the pulses that are applied to its input on line 86. A variable resistor 92 and resistor 94 define a voltage bridge that varies the level of the output voltage level that is produced on the output line 90.

The circuitry provides protection against a run-away speed condition occurring during operation of the engine. This is accomplished by the convertor 88 providing a voltage level on line 90 that is utilized to switch the transistor 60 into conduction and shunt the ignition capacitor 12 as has been previously described. This is accomplished by the voltage on line 90 being connected to one input of a comparator 96 through resistor 98 and line 100. The other input 102 comprises the reference voltage against which the input on line 100 is compared, and the output line 104 of the comparator 96 goes low (or approximately 0 volts) when the voltage on input line 100 is greater than the reference voltage on line 102. In an operating condition that does not represent an overheat condition, the voltage level on line 102 is designed to be approximately 5 volts.

This voltage is supplied by the power supply through voltage reducing circuitry that will now be described. The voltage level on line 80 has been previously described as being approximately 12 volts. Line 80 is connected through a resistor to a line 108 that is connected to a zener diode 110 and a regulated voltage of approximately 9 volts is applied on line 108. The line 108 is connected to a resistor 112, which in cooperation with a resistor 114, functions as a voltage divider and provides a voltage of approximately 5 volts on a line 116. Line 116 is connected to the line 102 through a resistor 118, and applies a voltage of approximately 5 volts to the reference voltage input of the comparator 96. The output line 104 of the comparator 96 is connected to the base of the transistor 60 via a resistor 120 and line 122.

During operation, the convertor 88 produces a voltage on output line 90 that is applied to one input of the comparator 96. When the speed reaches a speed of approximately 6000 rpm, the comparator 96, comparing a reference voltage of approximately 5 volts, produces a low voltage on output line 104 that results in transistor 60 switching on, thereby shunting ignition capacitor 12 and limiting the speed of the engine. Protection against a run-away speed condition is provided by a relatively few number of circuit components.

The maximum speed of operation is reduced from approximately 6000 rpm to about 2500 rpm if an overheat condition is detected. This is accomplished using the same comparator 96 in combination with temperature sensing circuitry. In this regard, a light emitting diode (LED) 124 is optically coupled to a opto-SCR 126. The LED 124 is connected to a 12 volt supply on line 74 through a resistor 128, and to ground through a diode 130 and an overheat temperature switch 132. The switch 132 is positioned to sense the engine temperature and is adapted to close at a temperature of about 212° F. When the switch 132 is closed, LED 124 is turned on, placing opto-SCR into conduction. This then lowers the reference voltage applied to the reference terminal of the comparator 96 to a level of approximately 2.3 volts. The lower reference results in a low output being produced on line 104 at a lower operating speed, as is intended. In operation, when an overheat condition is detected, the comparator switches low at an operating speed of about 2500 rpm, and thus shunts the ignition capacitor to limit the speed to about 2500 rpm when the engine becomes overheated.

The nature of the operation of the opto-SCR is such that it will not be turned off until power is removed from the circuit, and this will not occur until the engine is turned off. This feature is desirable in that it prevents the circuitry from cycling on and off at or about the critical overheat temperature.

In accordance with the present invention, the system automatically provides an advance in the timing characteristic when the engine is initially started and until the engine reaches a predetermined minimum warm-up temperature. This is accomplished by circuitry that controls the switching of the transistor 42. With respect to the warm-up aspect of the circuit operation, a line 134 is connected to a warm-up switch 136 to ground, and switch 136 closes when the sensed engine temperature exceeds a temperature within the range of about 80° to about 90° F. The line 134 is normally high, but goes low when the engine warms up sufficiently to close the switch 136. The line 134 is connected to the comparing input line 138 of a comparator 140 through a resistor 142. Comparator 140 provides a high output on line 144 when input line 138 is high. The line 144 is connected to an input line 146 of an AND gate 148 via a resistor 150. The other input line 152 to AND gate 148 is normally high until a predetermined speed is reached by the engine as will be subsequently described, an AND gate provides a high output on line 154 when input lines 146 and 52 are high. The line 154 is connected to the base of transistor 42 and to the collector thereof via a resistor 156 and a line 158. When the AND gate output is high, the transistor 42 is switched into conduction, which activates the advanced timing characteristic as has been previously described.

From the foregoing, it should be understood that the engine will be operated in the advanced timing characteristic until the engine warms up to an operating temperature of about 80° to about 90°. When switch 136 closes, the input 138 will be pulled low, thereby switching comparator 140 low and producing operation in the normal nonadvanced ignition timing characteristic.

As previously described, the engine will also operate in its advanced timing characteristic for a short variable time period after initial start-up, which is a function of the temperature of the engine. This is accomplished by having the starter solenoid (not shown) apply a voltage to charge a capacitor 160 via a line 162, a diode 164 and a line 166. The line 166 is connected to the input line 138 to the comparator 140 via resistor 168. Upon starting of the engine the starter solenoid will charge the capacitor 160 which will provide a high level on input line 138 and place the engine in the advanced timing characteristic mode of operation for the time period required to discharge the capacitor to a level where the comparator 140 is switched low.

In accordance with an important aspect of the present invention, and in the illustrated embodiment, the duration of the advanced ignition timing is determined by the temperature of the engine in two ways. First, the capacitor 160 can be discharged through the resistor 142 when the switch 136 is closed, which occurs when the temperature of the engine has reached the minimum temperature of 80° to 90°. Also, it can discharge through the line 138 and a thermistor 169. The resistance of the thermistor 169 varies as a function of the temperature, and decreases as the temperature increases.

If the switch 136 is closed, discharge of the capacitor 160 occurs in approximately 5 seconds. Thus, if the engine is stopped its having run for a sufficient period of time that results in it having reached its normal running temperature, a restart of the engine with the switch 136 closed will result in the nonadvanced ignition timing being switched in after the approximately 5 second time period. In other words, the timing is advanced for the initial 5 seconds.

It is understood by those in the outboard motor art that the motor uses the body of water in which the boat the motor is powering for cooling purposes. The water can have foreign matter, such as sand, dirt and debris in it which can be admitted into the motor during operation. During the circulation of the water, it must pass through the thermostat of the motor, and the thermostat necessarily has a restriction in which such foreign matter can become lodged. When this occurs, the thermostat may be incapable of closing, and in such event, the motor may not be able to reach the 80 to 90 degree F. operating temperature for an extended time period. In some circumstances, the switch 136 may not close for 20 minutes or more, which in the absence of the thermistor 169, would result in the motor operating in the advanced ignition timing mode of running for that entire time period. When the motor is operated in the advanced ignition timing mode, it tends to run faster, including faster idling, and such faster running speed presents some difficulty to fishermen in maneuvering a boat, for example. The presence of the thermistor 169 prevents the engine from running in the advanced ignition timing mode for an extended period of time if this relatively common problem occurs.

Much of the circuitry of FIG. 1 is contained inside of the motor cowling and as the motor runs, heat is generated which raises the ambient temperature within the cowling and therefore the thermistor 169. As the temperature increases, the resistance of the thermistor 169 decreases so that the discharge of the capacitor 160 occurs more rapidly. It is preferred that the temperature versus resistance characteristics of the thermistor be such that the advanced ignition timing be switched back to the nonadvanced timing in approximately 30 seconds when the engine is first started at a temperature of about 70° F., and in only a relatively few minutes when the engine is first started at a temperature of about 32° F. The presence of the thermistor 169 prevents an extended time period of advanced ignition timing operation that may otherwise occur due to faulty thermostat operation that is not uncommon in outboard engines.

Provision is made to automatically inhibit the advanced timing characteristic if the operating speed of the engine exceeds a predetermined level of approximately 1100 rpm in the preferred embodiment. Operating the engine with the ignition advanced above this speed could result in damage to the engine.

To inhibit the advanced timing characteristic, the convertor output 90 is connected to the comparing input 100 of a comparator 170, the reference input 172 of which is connected to line 116 via a resistor 174. The reference voltage is chosen to cause the comparator to have its output line 176 switched low when the comparing voltage increases to a level to switch the comparator at an operating speed of approximately 1100 rpm. When output line 176 is low, it removes a high voltage applied to the AND gate 148, thereby causing it to switch and provide a low output which switches transistor 42 off and removes the engine from its advance timing characteristic mode of operation. Thus, the circuitry always prohibits operation in an advanced timing mode above approximately 1100 rpm, even if the engine is not warmed up.

From the foregoing description of the circuitry, it is apparent that the power for operating the control circuitry is obtained from the stator coil inducing a voltage that is regulated to power the circuitry. During initial start-up, the cranking speed may not be sufficient to provide reliable voltage levels to insure reliable circuit operation. Provision is made to supplement the output of the power supply with power supplied from the starter solenoid during cranking. This is accomplished by coupling the starter solenoid voltage on line 162 to line 74 via the diode 164, line 166 and a diode 180.

An ignition system for an internal combustion engine has been described which has many desirable positive features in terms of its design and operation. Many attributes of the system are carried out using a circuit design that utilizes a relative conservative number of components and yet performs many desirable functions.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine, said trigger pulse generating means being adapted to provide a first timing characteristic for discharging said ignition capacitor means and a second timing characteristic that is advanced a predetermined time relative to said first timing characteristic, said trigger pulse generating means providing said second timing characteristic in response to an advance signal being applied thereto;

means for selectively generating an advance signal for application to said trigger pulse generating means, said advance signal generating means producing said advance signal only when enabled;

means for enabling said advance signal generating means for a variable time period after startup of the engine, said enabling means including a timing means for controlling the variable time period, said time period being within the range of a predetermined minimum time period and a longer time period that is a function of the temperature of the engine, said predetermined minimum time period occurring in response to immediate receipt by said timing means of a signal that is indicative of the sensed engine temperature being at a first predetermined level;

said longer time period occurring in response to the receipt by said timing means of one of:

said signal that is indicative of the sensed engine temperature reaching said first predetermined level; and, a signal that is indicative of an electrical resistance value that is a function of a second temperature level; whichever occurs first.

2. A system as defined in claim 1 wherein said timing means includes a capacitor which is adapted to be charged to a predetermined voltage level during starting of said engine, said enabling means enabling said advance signal generating means when said voltage is charged to said predetermined voltage level, and disabling said enabling means when the voltage level falls below a second predetermined voltage level, said timing means including at least first and second voltage discharge paths, said first path being connected to receive said signal that is indicative of the sensed engine temperature being at said first predetermined level, and to discharge said capacitor to said second predetermined voltage level in said predetermined minimum time period when said signal is received.

3. A system as defined in claim 2 wherein said second discharge path includes a resistance means having a temperature dependant resistance value, said second path being adapted to discharge said capacitor in a time period that decreases as the temperature of said resistance means increases.

4. A system as defined in claim 3 wherein said resistance means comprises a thermistor.

5. A system as defined in claim 4 wherein said thermistor is located in close proximity to said engine.

6. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine, said trigger pulse generating means being adapted to provide a first timing characteristic for discharging said ignition capacitor means and a second timing characteristic that is advanced a predetermined time relative to said first timing characteristic, said trigger pulse generating means providing said second timing characteristic in response to an advance signal being applied thereto;

means for selectively generating an advance signal for application to said trigger pulse generating means, said advance signal generating means producing said advance signal only when enabled;

means for enabling said advance signal generating means for a variable time period after startup of the engine, said enabling means including a voltage storing means and first and second circuit means, each of said circuit means being adapted to discharge said voltage storing means, said voltage storing means being charged to a first predetermined voltage level during startup of the engine and enabling said advance signal generating means when the voltage level of said voltage storing means is above a second predetermined level that is lower than the first predetermined level;

said first circuit means including a first resistance means and a switch means, said first circuit means being adapted to discharge said voltage storing means below said second predetermined level in a predetermined minimum time period when said switch means is closed, said switch means switching to a closed condition in response to the engine reaching a minimum operating temperature;

said second circuit means including a second resistance means having a resistance value that varies inversely with temperature, said second circuit means being adapted to discharge said voltage storing means below said second predetermined level in a variable time period greater than said minimum time period during operation of the engine.

7. A system as defined in claim 6 wherein said voltage storing means comprises a timer capacitor and said system includes a third circuit means connecting said timer capacitor to a source of power during startup of the engine to thereby charge said capacitor to said first predetermined level during startup.

8. A system as defined in claim 6 wherein said second resistance means comprises a thermistor having a variable resistance value that decreases as the temperature of said thermistor increases.

9. A system as defined in claim 6 wherein said thermistor is located in close proximity to said engine so that the heat generated by the engine will change the resistance value of said thermistor during operation.

10. An ignition system for an internal combustion engine of the type which has a starter and a source of power for operating the starter, said system being of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine, said trigger pulse generating means being adapted to provide a first timing characteristic for discharging said ignition capacitor means and a second timing characteristic that is advanced a predetermined time relative to said first timing characteristic, said trigger pulse generating means providing said second timing characteristic in response to an advance signal being applied thereto;

means for selectively generating an advance signal for application to said trigger pulse generating means, said advance signal generating means producing said advance signal only when enabled;

means for enabling said advance signal generating means for a time period that varies between a minimum time period and a temperature dependent longer variable time period after startup of the engine, said enabling means including a voltage storing means and at least first and second circuit means each of which is capable of discharging said voltage storing means, said voltage storing means being charged to a first predetermined voltage level during startup of the engine and enabling said advance signal generating means when the voltage level of said voltage storing means is above a second predetermined level that is lower than the first predetermined level;

said first circuit means including a first resistance means and a switch means, said first circuit means being adapted to discharge said voltage storing means below said second predetermined level in a predetermined minimum time period when said switch means is closed, said switch means switching to a closed condition in response to the engine reaching a minimum operating temperature;

said second circuit means including a second resistance means having a resistance value that varies with temperature, said second circuit means being adapted to discharge said voltage storing means below said second predetermined level in a variable time period greater than said minimum time period during operation of the engine, said variable time period having a shorter duration as said resistance value decreases with an increased temperature.

11. A system as defined in claim 10 wherein said second resistance means comprises a thermistor having a variable resistance value that decreases as the temperature of said thermistor increases.

12. A system as defined in claim 11 wherein said thermistor is located in close proximity to said engine so that the heat generated by the engine will change the resistance value of said thermistor during operation.

* * * * *